Patented Apr. 27, 1926.

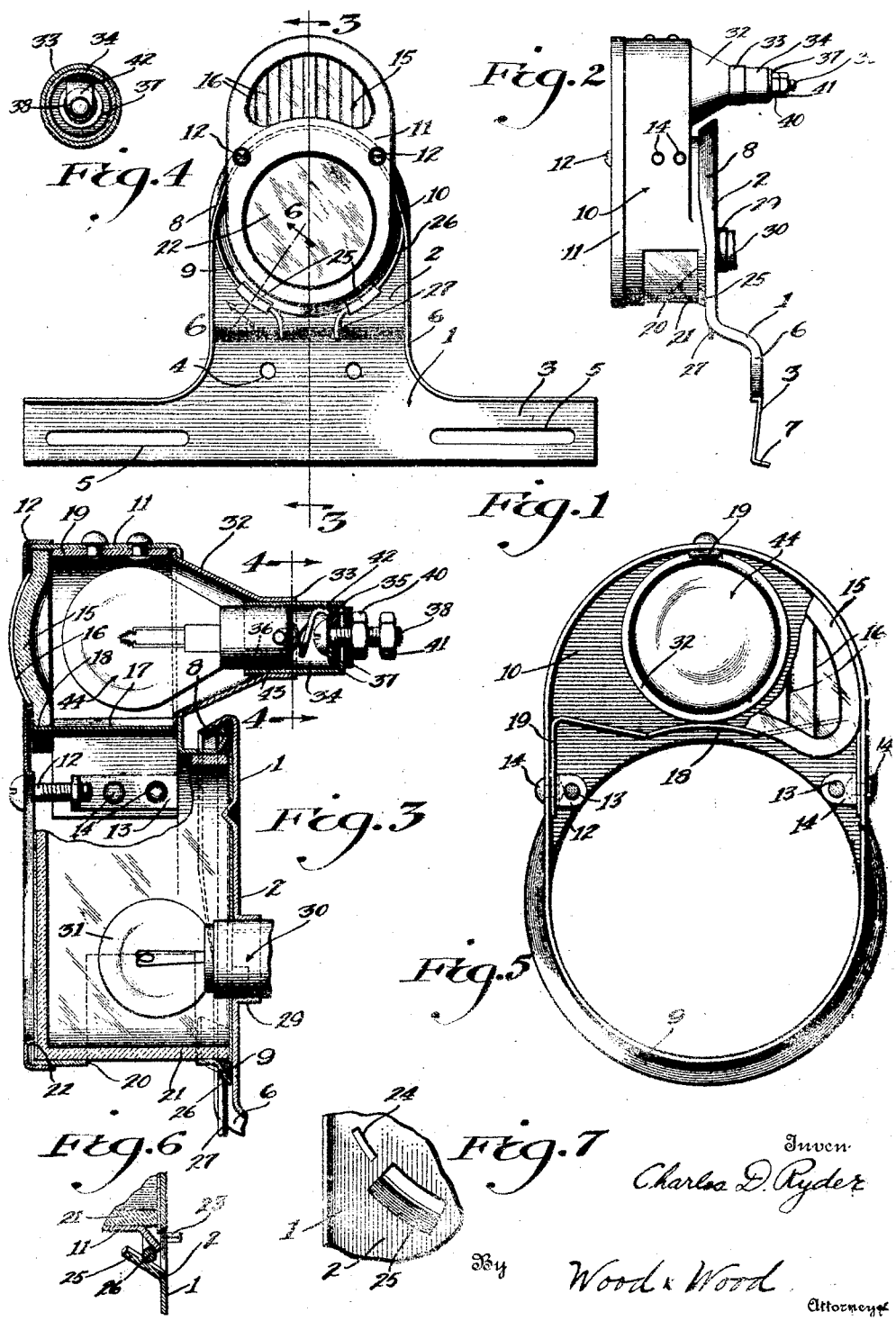

1,582,308

UNITED STATES PATENT OFFICE.

CHARLES D. RYDER, OF COVINGTON, KENTUCKY, ASSIGNOR TO THE CINCINNATI VICTOR COMPANY, OF CINCINNATI, OHIO, A CORPORATION OF OHIO.

SIGNAL LAMP.

Application filed January 22, 1925. Serial No. 4,071.

*To all whom it may concern:*

Be it known that I, CHARLES D. RYDER, a citizen of the United States, and residing at Covington, in the county of Kenton and State of Kentucky, have invented a new and useful Signal Lamp, of which the following specification is a full disclosure.

This invention relates to automobile lamps and is particularly directed to a combined tail lamp and auxiliary signal lamp, the latter being adapted to be independently controlled by a switch on the brake or dashboard.

More specifically this invention is directed to a casing containing an auxiliary light and adapted to house a tail light, the casing being interchangeable with a conventional tail light housing.

One object of the invention is to provide a tail light and an auxiliary light for automobiles which may be mounted thereon as a unit.

Another object of the invention is to provide a rear signal lamp for automobiles, having a casing adapted to be interchanged with a conventional or commercial tail light casing combining or connecting the tail and signal lamps in a unitary structure and facilitating the installation of the signal light to the automobile.

Another object of the invention is to provide a signal casing comprising a complete auxiliary light and a tail light housing adapted to be substituted for a conventional tail light housing.

Other objects and certain advantages will appear in the description of the drawings forming a part of this specification, in which drawings:

Figure 1 is a face view of my improved signal lamp showing it in mounted position.

Figure 2 is a side view thereof.

Figure 3 is a sectional view taken on line 3—3 of Figure 1, showing the interior and detail of the lamp.

Figure 4 is a detail sectional view taken on line 4—4 of Figure 3.

Figure 5 is a face view with certain parts removed to show the construction of the lamp casing.

Figure 6 is a detail sectional view taken on line 6—6 of Figure 3.

Figure 7 is a detail fragmentary face view of a portion of the mounting plate.

On the rear of the automobile is attached the mounting plate 1 which is preferably of sheet metal and comprises an upper lamp holding portion 2, and a lower license holding portion 3. These two portions are offset with relation to one another in order that light from the tail light may be thrown upon the license plate at a correct angle so as to thoroughly illuminate it.

In the license holding portion are holes 4 through which pass means (not shown) of attaching this plate to the fender or main body of the automobile. This license holding portion is provided with horizontal slots 5 to accommodate bolts (not shown) adapted to hold on the license plate (not shown). The top of the this plate holding portion is flanged outwardly over the plate as at 6 and the bottom of this plate holding portion is flanged in the other direction, as at 7. This flanging is for the purpose of providing a stronger structure.

The light holding portion is semi-circular in shape at the top and the metal is bent over to form a semi-circular bead 8 which serves as a socket for the upper edge of the circular attachment flange 9 of the light holding casing 10. This casing comprises a complete signal lamp with a tail light housing extending below. The circular flange is at the back of this extension. More specifically the light holding casing comprises a body portion which is somewhat oval shaped in the plane of the holding plate and has its long axis vertically disposed. The front of this casing comprises a flanged face plate 11 attached to the oval portion by means of screws 12 extending through the face plate into brackets 13 attached by rivets 14 to the opposite sides of the oval body. This face plate 11 is provided with a lower circular aperture or tail light opening and an upper moon shaped opening for the auxiliary light. In this upper aperture is a lens 15 preferably colored and provided with vertically extending ribs 16 the purpose of which is to diffuse light laterally and thus make the light source appear larger than it is. This lens is supported by an opaque partition 17 which separates the tail light chamber from the auxiliary light chamber thereby rendering said lights optically independent of each other. The partition comprises a bent strip, preferably metallic, secured by the rivets 14 which hold the brackets 13, and passes behind the lens 15 to hold it against the face plate 11. A projection 18 extends from the center of the strip under the lower edge of the lens to which it is shaped, thus affording vertical support. The lens is further held at the top by a strip 19 riveted to the upper oval portion of the casing and engaging the back of the lens.

The bottom of the casing has a cutaway portion 20 to permit some of the light from the tail light chamber to be thrown down upon the license plate. The tail light chamber is further enclosed by a glass cup 21, preferably clear glass, adapted to fit within the circular flange of the casing and is held between the mounting plate 1 and the face plate 11. In order to supply the red color which is customary for the tail light, a thin sheet of colored transparency 22, such as celluloid, is interposed between the glass cup and the face plate.

Near the bottom of this flange two teeth 23 project inwardly through small slits 24 in the mounting plate to prevent the casing from being displaced by rotation. Just below the casing and circumferentially aligned with the bead, two curved clips 25 are turned up from the metal of the mounting plate. In fastening the casing upon the plate the flange of the casing is fitted under the bead of the plate and then a spring split rim 26 is slipped in between the bead, the clips and the flange. This securely attaches the casing to the plate. The ends of the rim are bent outwardly in order to afford handles 27 for inserting and removing the same.

At the back of the tail light chamber, the plate 1 is flanged outwardly to provide a short sleeve 29 in which is secured the socket 30 for the tail light bulb 31. At the rear of the auxiliary light chamber is a circular aperture in the plate, in which aperture is secured a cone 32 which tapers to a sleeve 33 adapted to hold the auxiliary light socket. This latter socket is of very simple construction and comprises a cylinder 34 open at the inner end and flanged at the outer end 35. Bayonet slots 36 are in the unflanged end and an abutment is provided at the flanged end, said abutment comprising two insulating washers 37, one on each side of the flange secured together by a screw 38 with the headed portion on the inside of the cylinder and a nut 40 on the outside of the outer washer. Another nut 41 is provided on the outside of said nut for the attachment of an outside wire and between the screw head and inside washer is a bent spring contact member 42 which engages the contact 43 of the auxiliary light bulb 44.

From the above disclosure it will be seen that I have provided as a new article of manufacture, a break or signal light mounted on a shell casing as a sole support and which shell casing is in and of itself interchangeable with certain casing portions of some more or less standardized tail lights.

This structure enables the utilization of certain standard tail light portions to serve as the mounting for signal light. It will be seen that the casing of the signal light superposed on the ordinary tail light has a positional advantage and that it also avoids the multiplicity of attachments which would be required to attach the signal light at some other portion of the car body. The reduction of the attachment parts, of course, reduces rattling and loosening of parts and hence vibration, as well as simplifying the attaching process.

Having described my invention, I claim:

A mounting plate, means securing said plate to an automobile, a substantially circular socket on said mounting plate, a casing provided with a circular flange adapted to be engaged in said socket, a spring split ring adapted to fit between said flange and said socket and hold said flange securely in said socket, a partition within said casing dividing it into two separate chambers, an electric light bulb mounted in said casing in one chamber, an electric light bulb mounted in said mounting plate in the other chamber, a lens secured in said first mentioned chamber, said lens supported by said partition and a glass cup surrounding the bulb in the other chamber said cup held between the casing and the mounting plate.

In witness whereof, I hereunto subscribe my name.

CHARLES D. RYDER.